United States Patent Office 2,800,869
Patented July 30, 1957

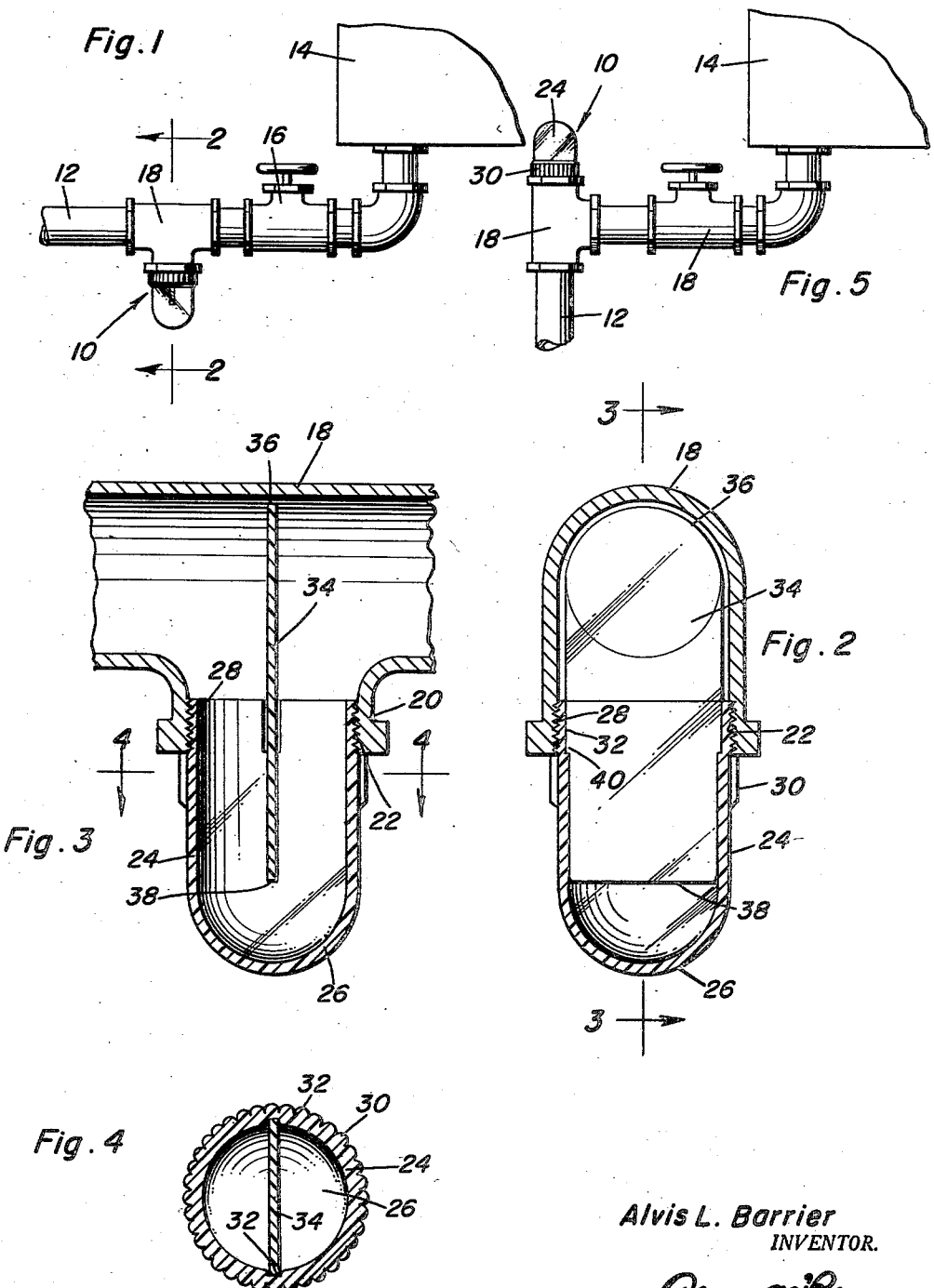

2,800,869

FLUID FLOW LINE INSPECTION DEVICE

Alvis L. Barrier, Mineral Wells, Tex.

Application January 4, 1956, Serial No. 557,318

8 Claims. (Cl. 116—117)

This invention generally relates to an inspection device and more specifically provides a device for inspecting the flow of fluids in a pipe line and more specifically for visually inspecting the flow of liquid through a closed pipe or the like.

The primary object of the present invention is to provide an inspection assembly specifically adapted to be installed in the drain line of a storage oil tank in order to determine the nature of the liquid flowing from the tank.

Another object of the present invention is to provide a visual inspection device in the form of a transparent member for the inspection of fluid flow from the bottom of a storage tank for oil in order to determine when all of the water and other sediment has been drained from the tank and oil begins to flow through the drain line.

Yet another object of the invention is to provide a transparent sight glass having a baffle extending into a pipe line for directing the flow of liquid through the sight glass in order to assure proper observation thereof.

Yet a further important object of the present invention is to provide a sight glass as set forth above in which the transparent cylindrical member is provided with easily detachable supporting means whereby the sight glass may be easily removed for cleaning and easily replaced in liquid tight condition.

Other important objects of the present invention will reside in its extreme simplicity of construction, ease of assembly in various positions, ease of attachment to existing or newly installed pipe lines, ease of observation, ease of cleaning, adaptation for its particular purposes and its relatively inexpensive manufacturing cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a side elevational view of the inspection device of the present invention installed on the drain line of an oil storage tank;

Figure 2 is a vertical sectional view taken substantially upon a plane passing along section line 2—2 of Figure 1 illustrating the relationship of the baffle and the pipe line as well as the cylindrical sight glass;

Figure 3 is a vertical sectional view taken substantially upon a plane passing along section line 3—3 of Figure 2 illustrating further structural details of the sight glass and baffle together with the manner in which liquid flows around the baffle;

Figure 4 is a detailed sectional view taken substantially upon a plane passing along section line 4—4 of Figure 3 illustrating the specific construction of the baffle and the sight glass and the interrelationship thereof; and Figure 5 is a side elevational view similar to Figure 1 illustrating another manner in which the inspection device of the present invention may be installed.

Referring now specifically to the official drawing, the numeral 10 generally indicates the inspection device of the present invention which has been installed in the drain line 12 from an oil storage tank 14 that is provided with a control valve 16 for selectively draining sediment and oil from the storage tank 14. A conventional T connection 18 is provided in the pipe line 12 for receiving the inspection device 10 of the present invention. As illustrated in Figure 5, the inspection device 10 may be installed in either end or the branch line of the T connection 18 in the drain line 12 whereby it will be readily apparent that the inspection device 10 may be installed in either vertical or horizontal position since all of the liquid flow goes directly through the inspection device 10.

As previously stated and specifically described, the T fitting 18 is provided with a branch coupling 20 having internal threads 22 thereon. A generally cylindrical sight glass 24 having a spherical closed lower end 26 is provided with external threads 28 at the upper end thereof for screw threaded engagement with the internal threads 22 in the branch coupling 20 of the T connection 18. Adjacent the external threads 28, the transparent sight glass 24 is provided with a plurality of semi-cylindrical projections 30 arranged circumferentially on the periphery thereof for forming a hand hold for rotating the transparent sight glass 24 for securely engaging the threads 28 with the threads 22. The upper ends of the semi-cylindrical projections 30 also form a shoulder for abutting engagement with the outer end of the branch coupling 20 of the T connection 18 thereby securely seating the transparent cylindrical sight glass 24 in the T connection 18 to prevent leakage of liquid therefrom.

Adjacent the upper end of the cylindrical sight glass 24 is provided a pair of diametrically opposed grooves 32 extending from the upper surface downwardly to a position generally in alignment with the upper end of the semi-cylindrical projections 30.

A baffle plate 34 is provided and includes a generally semi-circular end 36 extending upwardly into the T connection 18 and generally conforms to the shape of the interior of the T connection 18 for forming a barrier to the flow of liquid through the T connection 18. The lower end of the plate 34 is provided with a straight portion 38 terminating in spaced relation to the semi-spherical bottom end 26 of the cylindrical sight glass 24 whereby liquid flow will be caused to pass downwardly along one side of the baffle plate 34 under and around the baffle plate 38 and then upwardly along the other side of the baffle plate 34 for passage back into the drain line 12 from the T connection 18. For proper seating of the baffle plate 34, a shoulder 40 is provided on each edge thereof for reception in the grooves 32 whereby the shoulder 40 rests against the bottom of the groove 32 for properly positioning the rounded end 36 of the baffle plate 34 in the T connection 18 and properly positioning the square portion 38 in relation to and spaced from the bottom 26 of the cylindrical sight glass 24.

The baffle plate 34 forces substantially all of the liquid flow transversely into the sight glass 24 regardless of the plane in which the sight glass 24 is disposed thereby assuring easy observation of the liquid flowing through the sight glass 24. In the event the sight glass 24 becomes dirty so that vision is impaired, it may be readily removed by the application of hand pressure, a wrench or any other suitable means wherein the sight glass 24 and baffle plate 34 may be wiped clean and replaced.

While the specific embodiment of the invention has been illustrated and described as being employed with an oil tank, it will be understood that the present invention may be employed wherever it is desirable to inspect the flow of liquid through a pipe which is normally closed whereby any change in the flow of liquid may be readily observed and the condition of the liquid flowing through the pipe may be readily determined. A typical use of the invention has been illustrated in the bleeding off of water and other impurities collecting in the bottom of storage tanks utilized to store crude oil gathered in oil fields. In this embodiment, it is desired to bleed off such water and impurities without bleeding off any good crude oil which floats above the water and impurities. Accordingly, the present invention makes it possible for the operator to cease bleeding water the instant it is gone and only good crude oil is left in the tank. Due to the dirty nature of the fluids handled, ordinary sight glasses quickly become opaque and without value. The particular construction of this invention permits ready disassembly, cleaning and reassembly thereof for enhancing the use of the device. The device may be constructed of any suitable material but it has been found that a clear plastic is adequate for most purposes and lends itself to relatively inexpensive manufacturing cost.

The position illustrated in Figure 5 of the official drawings may be employed if a rapid bleeding is to be employed and may be used without the baffle if rapid bleeding or drain off is desired from the tank 14 and relative slow and complete bleeding is desired, the arrangement of Figure 1 can best be utilized.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A flow indicator assembly, the combination with means through which liquid flows, of a sight glass assembly with its outer end closed and its inner end open to the bore of the fluid conduit, a means of attaching the sight glass directly to a closed fluid conduit, a baffle plate removably attached to the sight glass and located therein, for forming an inflow and outflow passage for liquid to and from the sight glass, said baffle plate extending beyond the open end of the sight glass and deflecting substantially all of the fluid through the sight glass.

2. In a flow indicator assembly, the combination with means through which liquid flows, of a sight glass assembly including a transparent sight glass with the outer end closed and its inner end open to the bore of the liquid conduit, a baffle plate disposed in said glass for forming an inflow and outflow passage for liquid to and from the sight glass, said baffle plate extending beyond the open end of the sight glass, means detachably securing said baffle to said glass, said baffle plate so constructed that it will enter into the fluid conduit while still detachably connected to and located in the sight glass body, without mechanical interference with said fluid conduit.

3. An inspection device for fluid flow lines comprising a transparent sight glass communicating with a fluid flow line, and a baffle attached to and mounted within said glass for directing substantially the entire flow of fluid through the sight glass for observation thereof.

4. An inspection device for fluid flow lines comprising a transparent sight glass communicating with a fluid flow line, and a baffle for directing substantially the entire flow of fluid through the sight glass for observation thereof, said sight glass having closed end and an open end with the open end detachably engaged with the flow line, said baffle extending into and forming substantially a closure for the flow line, said baffle terminating in spaced relation to the closed end of the sight glass whereby fluid is directed through said sight glass for observation, a shoulder on an edge of said baffle, and said glass having a groove near its open end and accommodating said shoulder to prevent said baffle from twisting in said glass.

5. The combination of claim 4 wherein said cylindrical sight glass is screw threadedly engaged with said flow line for ready removal, cleaning and replacement of the sight glass and baffle.

6. A flow inspection device comprising a transparent sight glass having an open end and adapted to be connected to a flow line, means for securing said glass to the flow line, a baffle adapted to pass into the flow line in order to direct the path of flow of fluid through said line, said baffle extending in part within said glass and having an edge which terminates at a place spaced from the closed end of said glass in order to establish a path for the diverted flow, and means securing said baffle to said glass so that when applying said glass to the line said baffle may be positioned transversely across said line in response to movement of said glass.

7. A flow inspection devices comprising a transparent sight glass having an open end and adapted to be connected to a flow line, means for securing said glass to the flow line, a baffle adapted to pass into the flow line in order to direct the path of flow of fluid through said line, said baffle extending in part within said glass and having an edge which terminates at a place spaced from the closed end of said glass in order to establish a path for the diverted flow, and means securing said baffle to said glass so that when applying said glass to the line said baffle may be positioned transversely across said line in response to movement of said glass, the last mentioned means comprising grooves in said glass near the open end thereof and on opposite sides of said glass, said grooves being adapted to accommodate opposed parts of said baffle.

8. The inspection device of claim 7 wherein said baffle has shoulders on the opposite sides thereof which are separably disposed in said grooves thereby separably connecting said baffle to said glass.

References Cited in the file of this patent

UNITED STATES PATENTS

| | | |
|---|---|---|
| 1,463,174 | Paterson | July 31, 1923 |
| 1,983,231 | Keitel | Dec. 4, 1934 |
| 2,481,882 | Sebold | Sept. 13, 1949 |
| 2,594,113 | Askin | Apr. 22, 1952 |
| 2,690,154 | Boos | Sept. 28, 1954 |